Feb. 28, 1967  L. ROSENVOLD  3,306,368
GROUND LEVELING DEVICE
Filed Sept. 16, 1964  3 Sheets-Sheet 1

INVENTOR
Leo Rosenvold
BY Robert E. Kleve
ATTORNEY

INVENTOR
Leo Rosenvold

BY Robert E. Klein

ATTORNEY

3,306,368
GROUND LEVELING DEVICE
Leo Rosenvold, Wildrose, N. Dak. 58795
Filed Sept. 16, 1964, Ser. No. 396,994
4 Claims. (Cl. 172—276)

This invention relates to farm equipment, more particularly, the invention relates to equipment for attachment to farm tractors and the like.

It is an object of this invention to provide a novel attachment to a farm tractor which attachment includes ground leveling tools situated in front of the tractor tires or wheels to level a path for the tractor to travel upon so that the operator will have a smoother ride when operating the tractor over rough terrain.

It is a further object of the invention to provide a novel attachment to farm tractors which is adjustably constructed to adapt to various types of farm tractors and which includes ground leveling tools which are spring biased to engage the ground in front of the tractor to smooth a path for the tractor, and which attachment is of a novel simplified construction.

It is a further object of the invention to provide a novel leveling attachment for a vehicle to level a path for the vehicle to travel upon.

It is another object of the invention to provide a novel leveling attachment having spring biased ground leveling tools adapted to be positioned in front of the front tires of a farm tractor.

Further objects and advantages of the invention will become apparent as the description proceeds and when taken in conjunction with the accompanying drawings wherein.

Briefly stated, the ground leveling or smoothing attachment invention comprises a frame pivotally attached to the front of a conventional tractor. The frame is horizontally extendable and has a vertically adjustable brace to adapt the frame to different types of tractors. A pair of ground smoothing sweeps pivotally attached to the front of the frame, with U-shaped ring members mounted to the sweeps. Compression springs are mounted between the sweeps and the frame to urge the sweeps downward for the sweeps to engage the ground with the smoothing sweeps smoothing a path for the tractor to travel forward on.

With further more detailed reference to the drawings, in FIGURES 1, 2, 3, 4, and 5 the first form of the ground smoothing tractor attachment 20 is shown attached to a conventional tractor 21. The first form of the invention is the preferred form.

*First form of the ground leveling tractor attachment*

Figure 1:
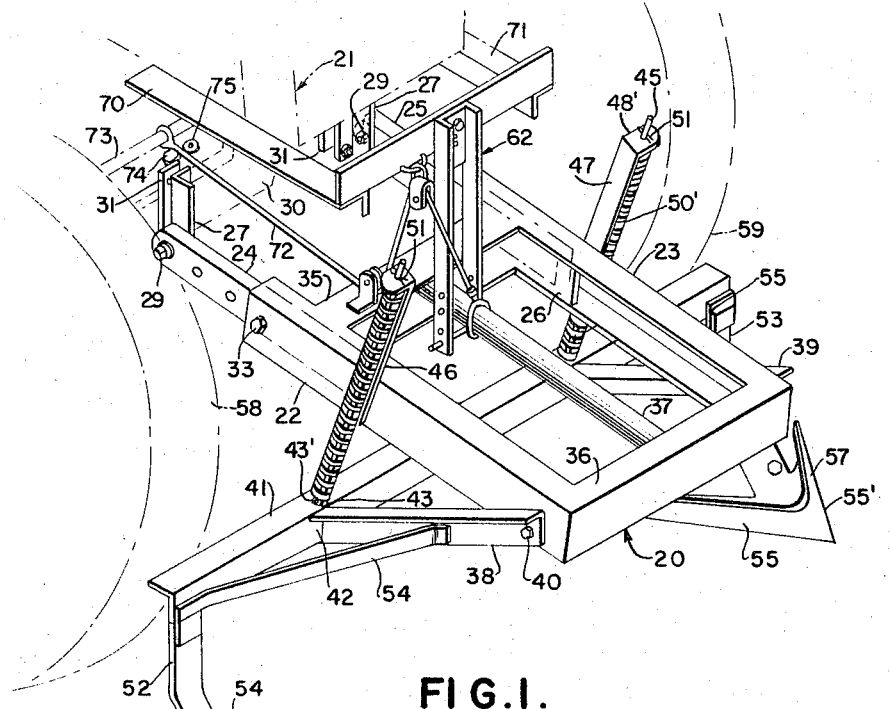
FIGURE 1 is a perspective view of the first form of ground leveling or smoothing tractor attachment, shown attached to a tractor.
Figure 2:
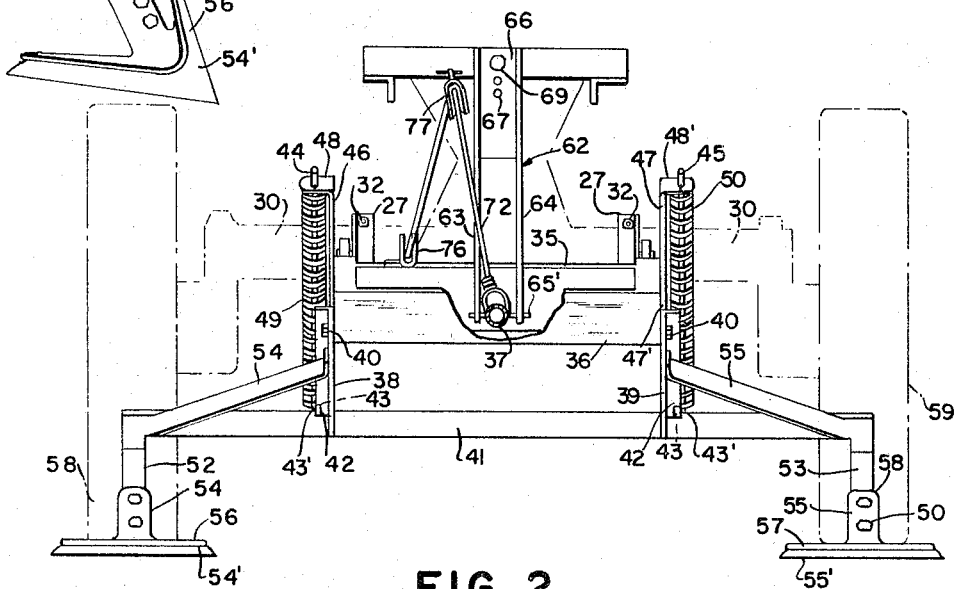
FIGURE 2 is a front elevational view of the first form of ground leveling tractor attachment.
Figure 4:
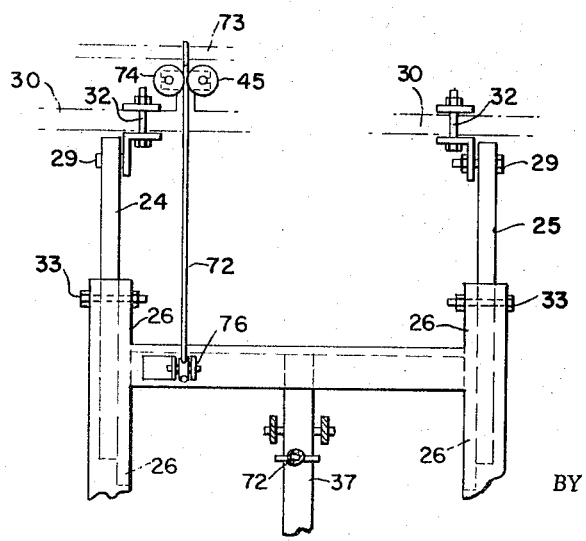
FIGURE 4 is a top fragmentary view of the first form of the invention showing the manner of attachment to the tractor.

First of preferred form of the leveling invention 20 has a horizontal frame which includes a pair of parallel rectangular channel members 22 and 23. A pair of rectangular beams 24 and 25 are slidably received within the channel members 22 and 23 respectively with each of the channel members 22 and 23 having an inner plate 26 welded thereto which acts to confine the beams 24 and 25 therein and guide the beams along the channel members. At the rear of each of the beams 24 and 25 are a pair of L-shaped plates 27 and 28 which are pivotally mounted to beams 24 and 25 respectively by a nut and bolt connection 29 as illustrated in FIGURES 1 and 4. The L-shaped plates are adapted to abut the front wheel frame 30 of the tractor, as shown in FIGURES 1 and 2. The front wheel frame 30 is fixed to the tractor 21 and acts to support the front wheels of the tractor, in a conventional manner. Two flat plates 31 are adapted to abut the rear face of the frame 30 adjacent their respective L-shaped plates. The plates 27 and 28 and 31 each has upper and lower bores with upper and lower nut bolt connections 32 passing through the bores to tighten the flat plates and L-shaped plates together and thereby secure the beams 24 and 25 of the frame to the front wheel frame of the tractor, through the pivotal connection 29.

The channel members 22 and 23 of the frame and the beams 24 and 25 are adjustably secured together by means of bolts 33 which pass through an aperture in the channel members 22 and 23 and through one of the apertures 34 in each beam member 24 and 25 and an aperture in the inner plate 26 of each channel member. The bolts 33 may be removed and the beams slid forward or rearward relative to the channel members of the frame until another suitable one of the apertures 34 in each beam is aligned with the channel and plate apertures of each channel so as to adjust the frame to different size tractors. Whereupon, the bolts 33 may be reinserted into the aperture of channel members and plates 26 and apertures 34 of the beam to reconnect the beams and channel members together.

The channel members 22 and 23 have a pair of cross channel members 35 and 36 which are welded to channel members 22 and 23 and connect them together to form the frame. A metal pipe 37 is welded at one end to the cross beam 35 and at the other end welded to the cross beam 36.

A pair of angle iron arms 38 and 39 are pivotally mounted to the forward portion of the channel members 22 and 23 by means of bolts 40, so as to pivot upward and downward about a horizontal axis. A lower cross beam 41 is welded to the rearward ends 42 of the bores 38 and 39, so that the lower cross beam 41 pivots about bolts 40.

On the lower cross beam 41 are a pair of mounting lugs 43 which are welded to the beam 41 in spaced relation. The mounting lugs 43 each has an aperture and the compression rods 44 and 45 each has an eyelet 43' with nut and bolt connections connecting the compression rods 44 and 45 to the mounting lugs to provide a pivotal connection for each compression rod relative to the lower cross bar 41.

A pair of elongated plates 46 and 47 are welded to the channel members 22 and 23 at their lower ends 46' and 47'. The plates 46 and 47 extend upwardly and forwardly at an angle relative to the channel members 22 and 23. At the upper end of each plate 46 and 47 are inturned flange portions 48 and 48'. The inturned flanges 48 and 48' have apertures for receiving the upper ends of the compression rods and act to support the upper ends of the compression rods. A pair of compression springs 49 and 50 are telescoped over the compression rods 44 and 45 respectively, with the upper ends of the springs abutting the under side of the inturned flanges and their lower ends abutting the cross bar adjacent the pivotal mounting of the compression rods. A pair of cotter pins 51 pass through apertures in the compression rods above the inturned flange portions to limit the downward movement of the compression rods and thereby limit the expansion of the compression springs.

At the outer ends of the lower cross bar 41 are a pair of plates 52 and 53 which depend downward from the cross bar and are fixed thereto by welding. The plates 52 and 53 curve forwardly at their lower ends. Metal reinforcing straps 52' and 53' are welded at their one ends to the outer ends of the cross bar 41 and at their inner ends to the angle iron arms 38 and 39.

At the lower end of the plates 52 and 53 respectively are a pair of smoothing sweeps 54 and 55 respectively which are fixed to the plates 52 and 53 by bolts 58.

Figure 3:
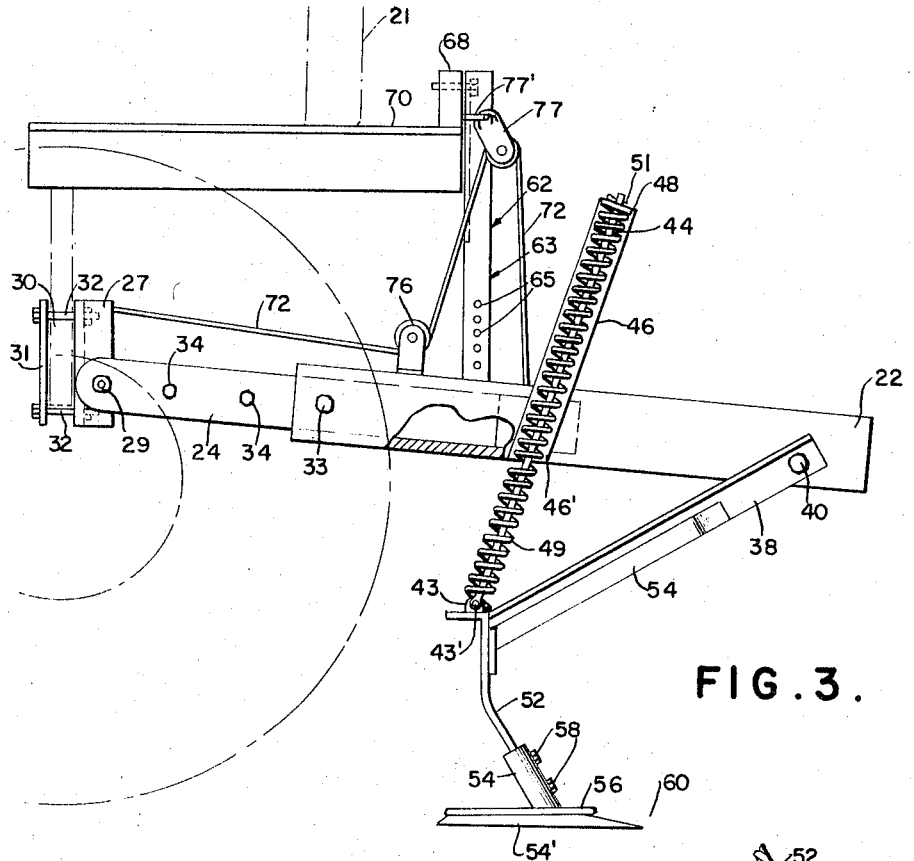
FIGURE 3 is a side elevational view of the first form of ground leveling tractor attachment.
Figure 5:
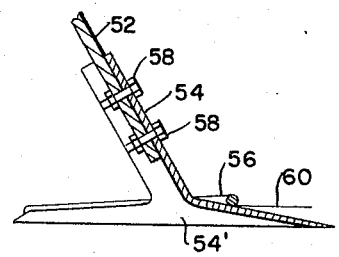
FIGURE 5 is a cross-sectional view taken along line 4—4 of FIGURE 3 disclosing the construction of one of the ground leveling tools and associated arm structure.

The compression springs are under a small amount of compression as illustrated in FIGURES 1, 2, and 3 with the rods at their lower limit as generally illustrated in FIGURES 1, 2, and 3. This small compression is of sufficient strength to continuously urge the cross bar downward and maintain it and its sweeps 54 and 55 in its operative position as shown in FIGURES 1–3 for normal leveling operations.

If, however, either sweep strikes an immovable object such as a boulder, both sweeps, the cross bar, and arms 38 and 39 will pivot rearwardly and upward in a clockwise direction when viewed from FIGURE 3 about the axis of the bolts 40, thereby raising the compression rods causing them to slide upward through the apertures in the inturned flanges and further compressing the springs.

The smoothing sweeps 54 and 55 (illustrated in FIGURES 1, 2, 3, 5, 6, 7, and 8) each has a U-shaped ring member 56 and 57 which are elongated cylindrical rods formed in a U-shape and welded to sweeps 54 and 55. The smoothing sweeps are aligned directly in front of the front wheels 58 and 59 of the tractor. The sweeps 54 and 55 are attached to the lower end of the plates 50 and 51 by the bolts 58 which are threaded into the forwardly curved portion 50' and 51' of the lower end of the plates 50 and 51.

The smoothing sweeps 54 and 55 act to engage the ground in front of the tractor tires as the tractor moves forward to smooth a path for the tractor to travel upon so that the operation will have a smoother ride when operating the tractor on rough terrain. The lower portions 54' and 55' of the sweeps travel beneath the level of the ground 60, and act to plow a shallow smooth path. The U-shaped ring members 56 and 57 tend to sweep the earth, picked up by lower portions 54' and 55', off to one side of the sweeps. The ring members tend to sweep the earth off to one side of the sweeps, for the purpose of preventing the earth from merely being picked up by the front of the portions 54' and 55' and having it travel over the lower portions and redeposited on the ground in back of the lower portions of the sweep. The ring members also tend to limit and even the depth the sweep will plow along the ground. The sweeps are shown in their operative position in FIGURES 1, 2, 3, and 5.

A suspension bracket structure 62 is provided for the frame intermediate the length of the frame of the attachment. The suspension bracket has a pair of side flanges 63 and 64 with a series of apertures 65 which are aligned laterally with one another and which receive a threaded pin 65' which is threaded into one pair of apertures 65. The pin may have a slot at one end so that it may be readily installed with a screw driver. The pipe 37 of the frame rests upon the pin 65', when the frame is in its operative position a shown in FIGURES 1, 2, and 3. The pin limits the downward pivoting movement of the frame. The pipe 37 of the frame is free to move upward along the flange 66 and 67, so that if the sweeps strike an immovable object, the frame can also pivot upward about the axis of the bolts 29 to allow the sweeps 54 and 55 to clear an obstacle.

The position of the frame may be adjusted by placing the pin 65' in a higher pair of apertures 65. The frame may then rest at a higher angle, so as to clear the ground, for example, when the sweeps are not being used.

Also, the bracket 62 has an upper back portion 66, formed integrally with the side flanges 63 and 64. The back portion 66 has a plurality of bores 67 to adjust the bracket relative to the metal strip 68. A bolt 69 is threaded into the metal strip 68 through one of the bores 67 to secure the bracket 62 to the strip 68. The metal strip 68 is welded to a pair of spaced angle irons 70 and 71, which angle irons 70 and 71 in turn are welded to the front end of the tractor 21, to thereby fix the strip 68 to the tractor and thereby attach the bracket 62 to the tractor.

The tractor attachment may be raised and lowered by a flexible metal cable 72 which is attached at one end to the pipe 37 of the frame and at the other end to the tie rod 73 of the tractor when the tractor operator turns the steering wheel of the tractor in either direction, this moves the tie rod laterally to turn the wheels, and the movement of the tie rod in either direction drawing the cable 72 rearwardly which raises the pipe 37 and frame about the pivot connection 29, thereby raising the smoothing sweeps so that they clear the ground.

Thus, when the wheels of the tractor are turned at the end of a plowing run, this turning automatically raises the smoothing sweeps out of engagement with the ground.

The metal cable 72 travels between a pair of rollers 74 and 75, which are rotatably mounted to the front wheel frame 30. The rollers act to guide the movement of the cable. The cable 72 also travels through a pulley 76, rotatably mounted to the member 35 of the frame, and through a pulley 77 which pulley 77 is rotatably mounted to and suspended from a metal strip 68, by means of a metal ring 77' fixed to the strip 68, at the front of the tractor.

*Second form of ground leveling tractor attachment*

Figure 6:
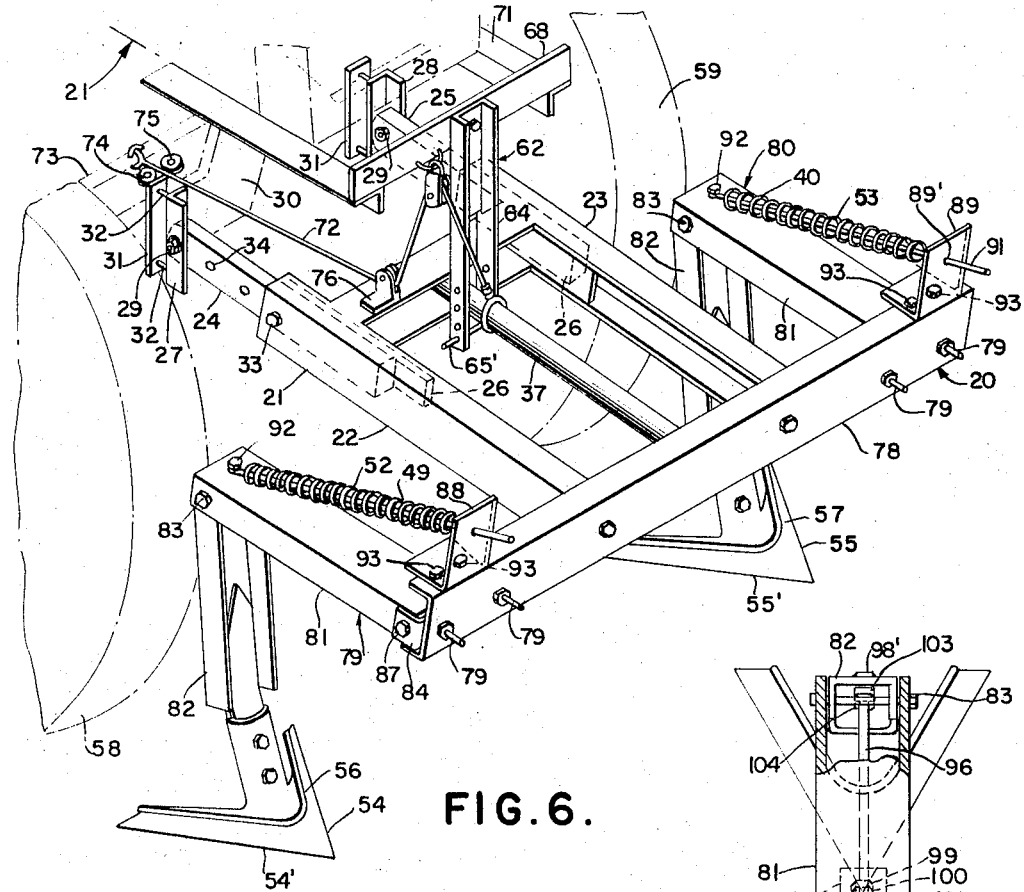
FIGURE 6 is a perspective view of the second form of the ground leveling tractor attachment leveling tools and its arm structure.
Figure 8:
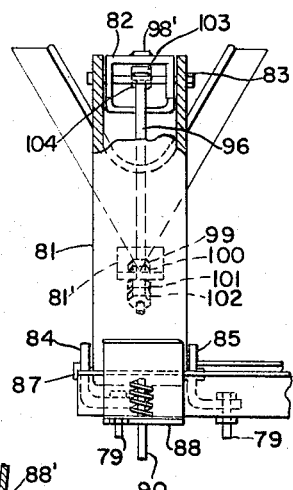
FIGURE 8 is a top fragmentary view of one of the arms of the second form of the invention.
Figure 7:
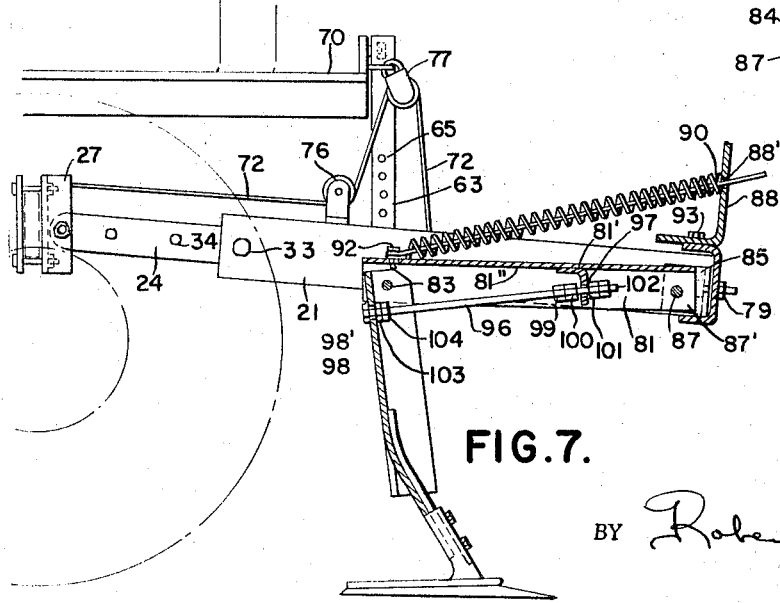
FIGURE 7 is a side elevational view of the second form of the invention.

The second form of the ground leveling tractor attachment is illustrated in FIGURES 6, 7, and 8.

The second form of the ground leveling invention, has the same suspension bracket structure and pulley raising and lowering structure, smoothing sweep structure as illustrated in the first, as well as the same pivotal connection to the frame 30 of the tractor with the exception that the L-shaped plates 27 are attached to the outside of the beams 24 and 25, instead of the inside as illustrated in the first form.

The channel members 22 and 23 having a front channel member 78 which is longer than the front channel member 36, and the front channel member 78 may be welded as well as bolted to the channel member 22 and 23.

The outer ends of the front channel member 78 have arm structure 79 and 80 pivotally mounted for independently suspending the smoothing sweeps 54 and 55, and to independently bias the smoothing sweeps downward.

The arm structure 79 and 80 each comprises a horizontal arm portion 81 and a vertical arm portion 82. The horizontal and vertical arm portions 81 and 82 are pivotally connected together by bolts 83. The horizontal arm portion 81 of each arm member is pivotally mounted to the front channel member 78 by means of a pair of L-shaped lugs 84 and 85 and for each arm member. The L-shaped lugs are in turn fixed to the front channel member 78 by nuts and bolts 86. The L-shaped lugs of both arm members 79 and 80 have apertures for receiving nuts and bolts 87 which pass through the horizontal arm portions 81 to provide the pivotal connection between the arm portions and the front channel member.

The above the arm portions are a pair of upright flanges 88 and 89 each having an aperture 88' and 89' and the rods 90 and 91 pass through the apertures 88' and 89' respectively at their one ends, which apertures are slightly oversized with respect to the rods. The rods 90 and 91 at their other end each have an eyelet portion and a bolt 92 passes through the eyelet which is threaded into the horizontal arm portion 81, in a manner so as to be sufficiently loose to allow the rod to pivot somewhat with respect to the arm portion 79. The upright flanges 88 and 89 are bolted to the front channel member by bolts 93.

A pair of compression springs 94 and 95 are telescoped over the rods 90 and 91 respectively and abut the bolt 92 at their one ends and the upright flanges 88 and 89 at their other end under a sufficient amount of pressure so as to bias the arm portions 79 and 80 downward with respect to the upright flanges 88 and 89. The compression springs 94 and 95 allow the arms to pivot upward in the event either smoothing sweep 54 and 55 strike an obstacle, such as a boulder.

The sweeps 54 and 55 are also in line with the rear wheels of the tractor, and thus provide a smooth path for the rear wheels and tires of the tractor to travel upon.

The ground leveling invention including its smoothing sweeps is shown in its operative position in FIGURES 6, 7, and 8 for leveling, with the frame inclined downward and forward and resting on pin 65'. The springs 94 and 95 as shown in FIGURE 7 are under a small amount of compression as the weight of the frame is greater than the compression strength of the springs. If the frame is raised counterclockwise from its position shown in FIGURE 2 about pivot bolts 29, the arms will pivot counterclockwise about bolts 87 as viewed from FIGURE 7, for a small angle until the lower corner 87' of the horizontal arm portion abut the lower inturned flange L-shaped lug 84 of the front channel member.

Each arm member 79 and 81 of the frame of the leveling invention has an adjustment rod 96 for adjusting the angular relation of the smoothing sweeps to the ground. The rod 96 passes through a bore 97 in an L-shaped lug 81' welded to the undersurface 81" of the horizontal arm portion 81. The rod 96 at the other end passes through a bore 98 in the vertical arm portion 82, with the head 98' of the rod 98 abutting the outer surface of the arm portion 82.

The rod 96 is used to adjust the angular relation of the vertical arm portion 82 relative to the horizontal portion 81, by threading the nuts 99, 100, 101, and 102 rearward, which draws the rod 96 and the vertical arm portions forward, thereby changing the angular relation of the sweeps relative to the ground. The rod 96 is used to adjust the angular relation of the vertical arm portion in the opposite direction by threading the nuts 99 through 102 inclusive in the opposite direction namely forward which pushes the adjustment rod 96 and vertical arm portion rearward. Also the nuts 103 and 104 will be loosened and retightened to accommodate the adjustment.

It will be apparent from the foregoing, that a novel ground leveling or smoothing invention has been provided which will smooth a path in front of the tractor tires for the tractor to travel on, and which may be easily installed and which is relatively inexpensive to manufacture.

It will be obvious that various changes and departures may be made in the invention without departing from the spirit and scope thereof and accordingly it is not intended that the invention be limited to that specifically shown in the drawings or described in the specification but only as set forth in the appended claims wherein what is claimed is:

1. A ground leveling device adapted to be attached to the forward end of a tractor comprising a frame, said frame having its rearward end pivotally mounted to said tractor, said frame having telescoping means to move said frame forwardly relative to said tractor to adjust said frame to different size tractors, a pair of arms pivotally attached to the forward end of said frame, sweeps attached to said arms to level a path in front of the tires of a tractor, biasing means urging said sweeps downward relative to said frame, cable means to raise said frame and sweeps off the ground when turning the tractor to either the left or right, said frame and sweeps being adapted to be raised by said cable free of said biasing means, said sweep having U-shaped rod means mounted to said sweeps with the U-portion of the U-shaped rod means projecting forward and slightly upward, said U-shaped rod means limiting the downward movement of the sweeps when leveling the ground.

2. A ground leveling device adapted to be attached to the forward end of a tractor comprising a frame, said frame having its rearward end pivotally mounted to said tractor, arm means pivotally mounted at the forward portions of said frame, a pair of sweeps attached to said arm means to level the ground in front of the tractor tires, biasing means urging said sweeps downward relative to the frame, cable means to raise said frame and sweeps off the ground when turning the tractor to either the left or right, said frame and sweeps being adapted to be raised by said cable means free of said biasing means, said sweeps having U-shaped rod means, said rod means being mounted to said sweeps with the U-portion of the U-shaped rod means projecting forward, said U-shaped rod means limiting the downward movement of the sweeps relative to the ground when leveling the ground.

3. A ground leveling device adapted to be attached to the forward end of a tractor comprising a frame, said frame having its rearward end pivotally mounted to said tractor, arm means pivotally mounted at the forward portions of said frame, sweep means attached to said arm means to level the ground in front of the tractor tires, biasing means urging said sweep means downwardly relative to the frame, raising and lowering means to raise said frame and sweep means off the ground when turning the tractor to either the left or right, said frame and sweep means being raised by said raising means free of said biasing means, said sweep means having means limiting the downward movement of the sweep means relative to the ground.

4. A ground leveling device according to claim 3 wherein said raising and lowering means comprises cable means adapted to be attached to the tie rod of the tractor.

References Cited by the Examiner

UNITED STATES PATENTS

| 250,782 | 12/1881 | Stewart | 172—739 |
|---|---|---|---|
| 848,848 | 4/1907 | Phillips | 172—722 |
| 1,769,086 | 7/1930 | Trotter | 172—255 |
| 2,131,872 | 10/1938 | Galpin | 37—181 |
| 2,164,543 | 7/1939 | Peacock | 37—181 |
| 2,282,367 | 5/1942 | Koistinen | 37—181 |
| 2,347,367 | 4/1944 | Silver | 37—181 |
| 2,505,280 | 4/1950 | Ellinghuysen | 37—181 |
| 2,521,631 | 9/1950 | Griffiths | 37—181 |
| 2,722,064 | 11/1955 | Jaffe et al. | 37—181 |

FOREIGN PATENTS

| 854,760 | 11/1960 | Great Britain. |
|---|---|---|

ANTONIO F. GUIDA, *Acting Primary Examiner.*

JOE O. BOLT, J. R. OAKS, *Assistant Examiners.*